(12) United States Patent
Tranberg

(10) Patent No.: US 6,745,682 B2
(45) Date of Patent: Jun. 8, 2004

(54) DEVICE FOR DRAINING LIQUID FROM CANNED GOODS

(76) Inventor: Thomas A. Tranberg, 6 Ferro Rd., Wolcott, CT (US) 06716

( * ) Notice: Subject to any disclaimer, the term of this patent is extended or adjusted under 35 U.S.C. 154(b) by 0 days.

(21) Appl. No.: 10/115,397

(22) Filed: Apr. 3, 2002

(65) Prior Publication Data

US 2003/0188641 A1 Oct. 9, 2003

(51) Int. Cl.[7] .................................................. B30B 9/06
(52) U.S. Cl. ........................ 100/110; 100/234; 100/243; 100/116
(58) Field of Search ............................... 100/110, 116, 100/126, 127, 234, 243, 104; 99/495, 506; D7/666, 674, 686, 687; 210/464

(56) References Cited

U.S. PATENT DOCUMENTS

| D330,313 S | 10/1992 | Green |
| D342,649 S | 12/1993 | Miller et al. |
| 5,272,968 A | 12/1993 | Keville et al. |
| D358,304 S | 5/1995 | Hoddinott |
| D366,189 S | 1/1996 | Bidlack |
| 5,902,481 A | 5/1999 | Schwietert |
| 6,068,870 A | 5/2000 | Strauss |
| 6,092,460 A | 7/2000 | Engelhardt |
| 6,112,650 A | 9/2000 | Mazzaccaro |
| 6,227,104 B1 | 5/2001 | Watkins, Jr. |
| 6,234,074 B1 | 5/2001 | Mangum |
| D444,357 S | 7/2001 | Meer et al. |
| 6,561,084 B2 * | 5/2003 | Lane .......................... 99/508 |
| 2003/0106439 A1 * | 6/2003 | Yarberry ..................... 100/110 |

* cited by examiner

Primary Examiner—Allen Ostrager
Assistant Examiner—Jimmy Nguyen
(74) Attorney, Agent, or Firm—Dale J. Ream

(57) ABSTRACT

A device for draining liquid from canned goods includes a compression lever pivotally connected to a base lever. The base lever includes a support surface extending between opposed ends for tabletop use. The base lever includes an end wall perpendicular to the support surface. The compression lever is pivotally coupled to the end wall. A handle is attached to the base lever at its free end, a can receiving section being defined between the handle and end wall. The device includes a piston having a perforated disk and connected to the compression lever in a ball joint/socket relationship. Therefore, a can may be positioned on the can receiving section and the compression lever and piston operated to drain liquid from the can. Multiple socket positions and pivot point configuration provide for a maximum leverage ratio while the support surface configuration allows for stable, one-handed operation of the device.

2 Claims, 9 Drawing Sheets

DEVICE FOR DRAINING LIQUID FROM CANNED GOODS

BACKGROUND OF THE INVENTION

This invention relates generally to devices that remove liquid from a food substance and, more particularly, to a stable, tabletop device for draining liquid from canned goods in a one-handed operation.

Many foods that are packaged in a can or other container either possess some liquid content or appropriate liquid is added during the packaging process. Tuna is an example of a food that is immersed in water or oil when it is packaged in a can for sale to consumers. This excess liquid must be removed or at least partially drained prior to consumption or use in the preparation of other entrees to avoid a soggy resulting food item.

Various devices have been proposed for draining excess liquid from food that is packaged in a container. Although assumably effective, existing devices are not adapted for convenient or stable tabletop use or for one-handed operation with low energy input, such as by person's with disability or lack of normal dexterity.

Therefore, it is desirable to have a device for draining liquid from canned goods that is adapted for stable, tabletop usage. Further, it is desirable to have a liquid draining device that offers one-handed operation. In addition, it is desirable to have a liquid draining device that enables adjustment for a maximum leverage ratio for use with cans of various sizes.

SUMMARY OF THE INVENTION

A device for draining liquid from canned goods includes a compression lever pivotally coupled to a base lever. The base lever includes a flat, linear support surface extending longitudinally along its entire extent. One end is free whereas an end wall extends upwardly from the other end and is perpendicular to the support surface. A handle member is situated on the base lever adjacent the free end such that a can receiving section is defined between the handle member and end wall. One end of the compression lever is pivotally coupled to a top edge of the end wall for movement between open and closed configurations. The compression lever includes a plurality of sockets spaced apart along its underside. The device includes a piston having a ball joint rotatably coupled to a selected socket and includes a perforated disk. This disk is configured to contact a food item packaged within a food can when the compression lever is moved between open and closed configurations, i.e. for draining water from canned tuna. As the support surface of the base lever maintains the device in a stable tabletop configuration, the levers may be manipulated by a person using a single hand. The support surface allows compressive force to be applied to the free end of the compression lever without tipping the device over.

Therefore, a general object of this invention is to provide a device for draining liquid from a canned food item.

Another object of this invention is to provide a device, as aforesaid, that includes a pair of levers that can be operated to compress a food item within a food container.

Still another object of this invention is to provide a device, as aforesaid, which can be operated in a stable, tabletop manner, whereby operation of the levers in a compressive motion does not tip, tilt, dislodge, or knock over the device.

Yet another object of this invention is to provide a device, as aforesaid, which can be operated with a single hand when situated on a tabletop or countertop.

A further object of this invention is to provide a device, as aforesaid, which provides for adjustable piston positioning to maintain an optimal leverage ratio between the compression lever and a respective food item within cans of various sizes.

A still further object of this invention is to provide a device, as aforesaid, in which a pivot point between the compression and base levers optimizes the compression leverage ratio.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 8a is a side view of the device as in FIG. 7a;

FIG. 8b is a sectional view taken along line 8b—8b of FIG. 8a.

DESCRIPTION OF THE PREFERRED EMBODIMENT

Figure 1:
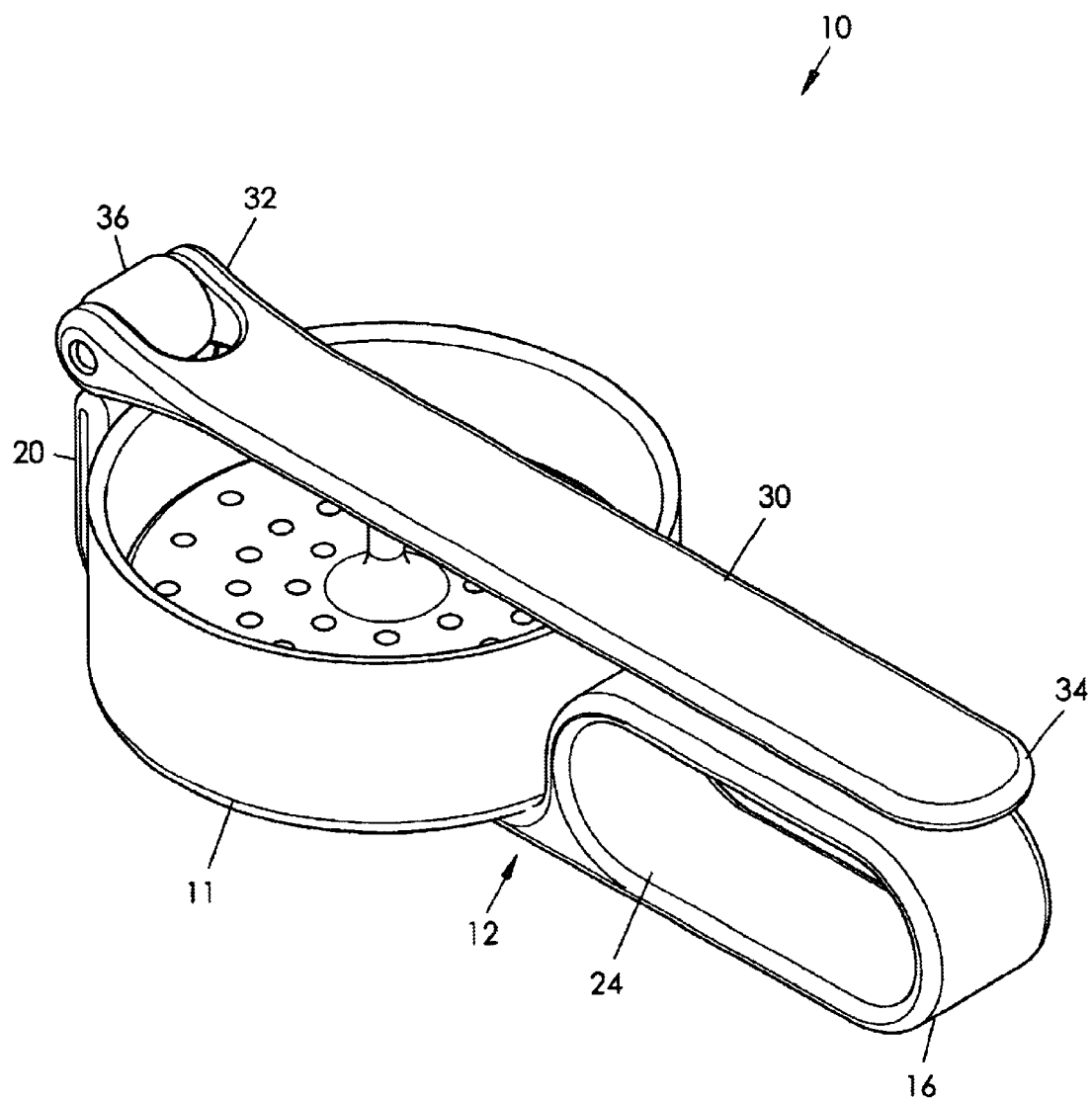
FIG. 1 is a perspective view of a device for draining liquid from canned goods according to one embodiment of the present invention in use with a canned food item.
Figure 2:
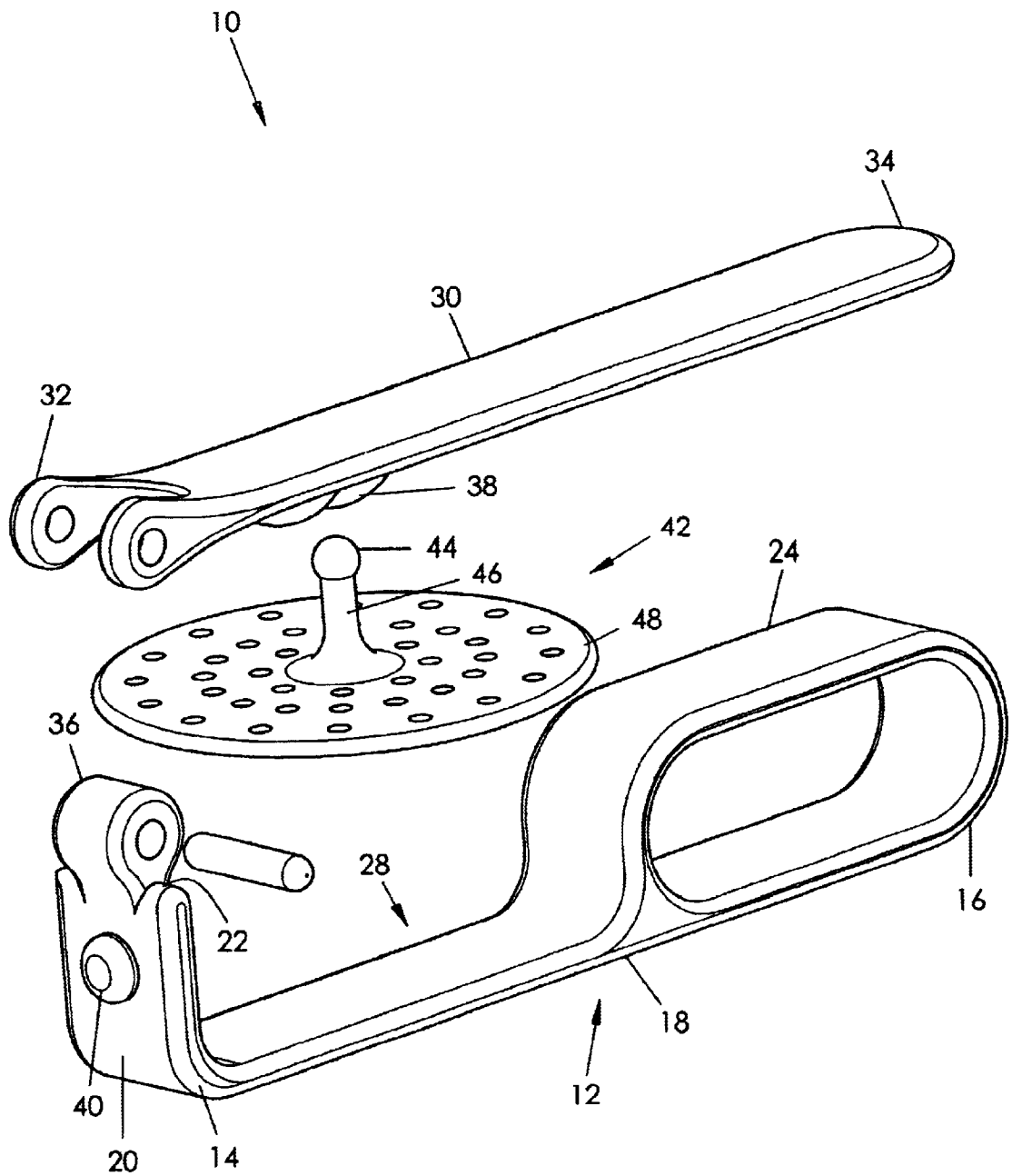
FIG. 2 is an exploded view of the device as in FIG. 1 with the can removed.
Figure 3A:
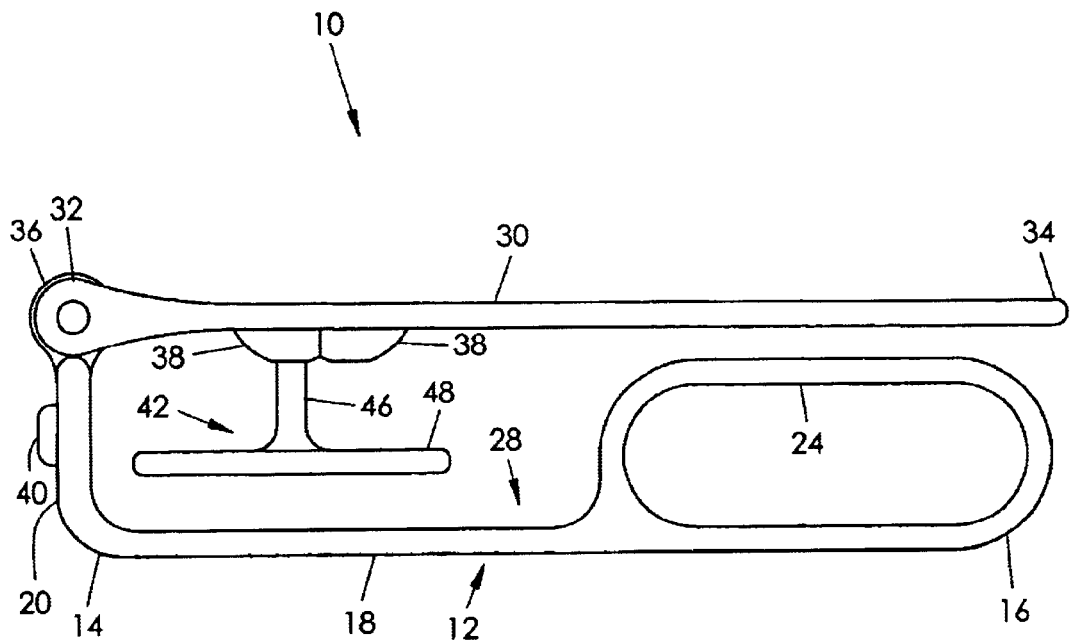
FIG. 3a is a side view of the device as in FIG. 1 with a piston coupled to one socket.

A device for draining liquid from canned goods according to the present invention will now be described in detail with reference to FIGS. 1 through 9 of the accompanying drawings. A device 10 for draining liquid from canned goods according to one embodiment of the present invention is shown in FIGS. 1 through 3b and includes an elongate compression lever 30 pivotally coupled to an elongate base lever 12 (FIG. 3a). The base lever 12 includes opposed first 14 and second 16 ends and includes a flat support surface 18 extending longitudinally between the opposed ends. The support surface 18 presents a linear configuration adapted to lie flat upon a countertop, tabletop, or the like so as to support the device 10 in a stable configuration during use (FIG. 2). The base lever 12 includes an end wall 20 fixedly attached to the first end 14 and extending upwardly therefrom perpendicular to the support surface 18.

Further, a handle member 24 is fixedly attached to the support surface 18 of the base lever 12 adjacent the second end 16 thereof. The handle member 24 presents a generally oval configuration with a generally hollow interior such that it may be grasped by a person's hand. Preferably, the handle member 24 is integrally connected to the support surface 18 such that the entire base lever 12 is easy to manufacture as a molded plastic component. The handle member 24 extends along only a portion of the support surface 18 from the second end 16 toward the first end 14 such that a can receiving section 28 is defined between the end wall 20 and handle member 24. The can receiving section 28 is of a sufficient longitudinal extent to selectively hold can goods of various conventional sizes.

Figure 3B:
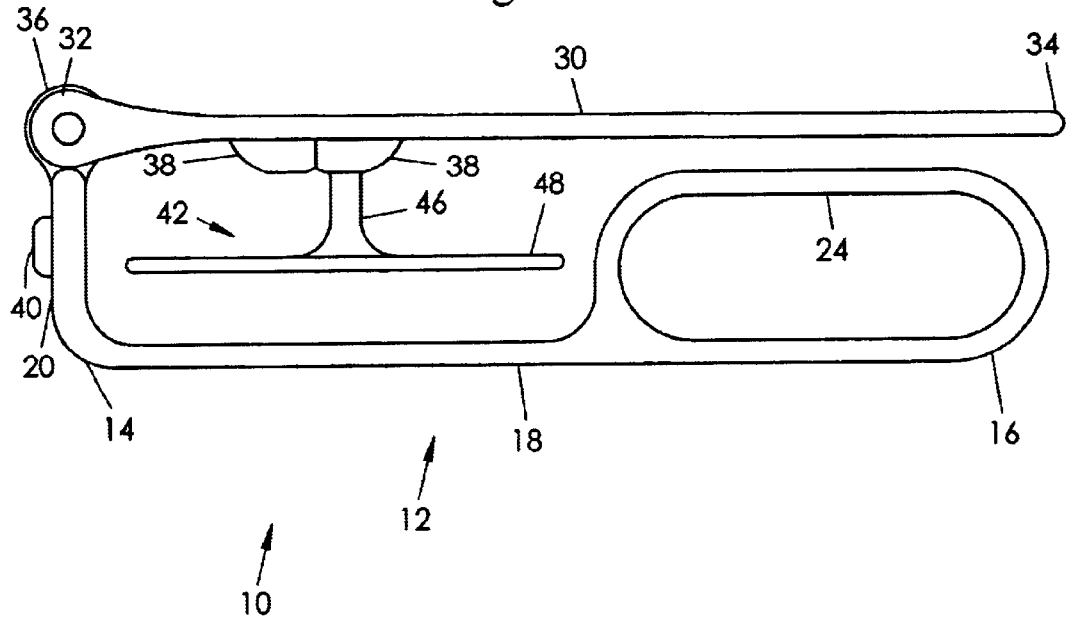
FIG. 3b is a side view of the device as in FIG. 1 with a piston coupled to another socket.

The elongate compression lever 30 also includes opposed first 32 and second 34 ends. The first end 32 of the compression handle is pivotally coupled to an upper edge 22 of the end wall 20 with a hinge 36 or other suitable fastener so as to form a pivot point. Therefore, the compression lever 30 is pivotal between an open/load configuration upwardly and angularly displaced from the base lever 12 (FIG. 3*a*) and a closed/press configuration generally parallel to the support surface of the base lever 12 (FIG. 1). A plurality of sockets 38 are attached to the underside of the compression lever 30 and spaced apart longitudinally therealong, a first socket being displaced from the first end 32 of the compression lever 30 and the plurality of sockets 38 being generally situated over the can receiving section 28 of the base lever 12 when the compression lever 30 is in closed/press configuration (FIGS. 3*a* and 3*b*). Of course, the sockets 38 could be integrally defined by the compression lever 30 itself in a molded plastic construction.

A magnet 40 is attached to an outer surface of the end wall 20 (FIG. 2) for removing a lid from a canned good 11 prior to compression of the can's food contents. Therefore, the device 10 may be grasped by the handle member 24 and positioned to make planar contact with the lid of a canned good whereby to magnetically remove the lid, assuming of course that the lid has already been severed from the can, i.e. with a can opener. Alternatively, the magnet 40 could be attached to the outer surface of the hinge 36 or other component of the device that would enable contact between the magnet 40 and a can lid.

The device 10 further includes a piston 42 having a ball joint 44 attached to one end of a connecting shaft 46 and a perforated disk 48 attached to an opposed end thereof (FIG. 2). The ball joint 44 is rotatable within a selected socket 38 such that the perforated disk 48 is able to remain in planar contact with a food item during operation. The perforations enable liquid squeezed out of the food item to escape therefrom during a press operation. The excess liquid may then be easily drained or poured. The ball joint 44 is adapted to be removably received by a selected socket 38 along the compression lever 30. Therefore, the entire piston 42 may be shifted along the compression lever 30 for optimal alignment with the open end of a respectively sized can that is positioned on the can receiving section of the base lever 12. Preferably, the device 10 includes multiple pistons having disks of different diameter such that an appropriately sized piston may be connected to an appropriately positioned socket for use with a can of respectively similar diameter. However, a single piston may still be used with cans of various diameters.

The inclusion and configuration of the end wall 20 for placement of the pivot point as well as the selective placement of the piston 42 along the compression lever 30 are important to providing maximum mechanical advantage. This is especially important to persons having physical disability, whereby to provide maximum output force (i.e. compression of the canned food) with the least amount of input force (i.e. energy to operate the compression lever). Mechanical force is synonymous with "leverage ratio". The leverage ratio of the present invention magnifies the input force by 2 to 5 times by placing the can to be pressed as close to the pivot point as possible. It should also be appreciated that an improperly positioned piston provides for inefficient pressure distribution upon the canned food item and thus reduces the practical effect of the leverage ratio. As a consequence, a portion of the food within the can would not be fully drained or dried. Therefore, the ability to selectively position the piston for use with various sizes of cans optimizes the leverage ratio applied to the can.

In use, the device 10 may be positioned with the support surface 18 of the base lever 12 on a tabletop, countertop, or even in a sink. Once the lid of a canned good 11 is severed, i.e. with a can opener, it may be removed by contact with the magnet 40. The compression lever 30 may be pivotally moved to the open configuration such that a canned good 11 may be positioned at the can receiving section 28 of the base lever 12. Depending on the size of the can to be drained, the ball joint 44 of the piston 42 may be selectively coupled to an appropriate socket 38 so that the perforated disk 48 is properly positioned to press against the food item of the canned good in an efficient distribution. Then, a user may press the second end 34 of the compression lever 30 downward toward the handle member 24. In other words, the compression lever 30 is pivotally moved to a closed configuration in which the perforated disk 48 of the piston 42 presses against the can contents with an optimal leverage ratio (FIG. 1). As the can contents are pressed (FIG. 1), excess liquid is allowed to escape through the perforations and may be poured therefrom. Again, it should be appreciated that this device maximizes the leverage ratio and reduces press inefficiencies so as to enable easy, one-handed usage in a tabletop use setting.

Figure 9:
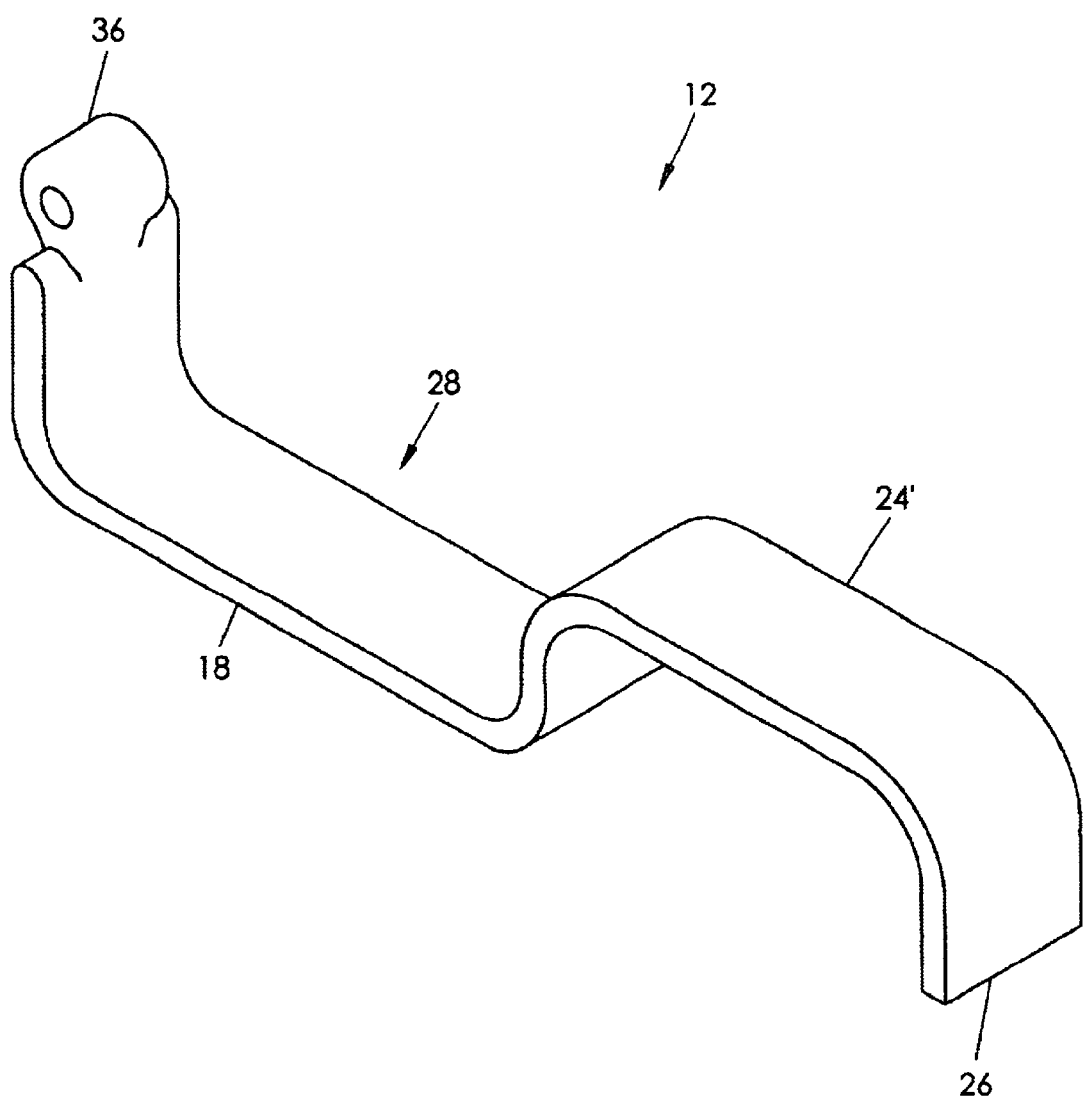
FIG. 9 is a perspective view of a base lever according to another embodiment of the present invention.

Another suitable configuration of the base lever 12 is shown in FIG. 9. It can be seen that a bottom/support surface of the base lever 12 need not extend completely between opposed ends of the base lever 12 in a linear configuration so long as a terminal end 26 of a modified handle member 24' terminates in the same horizontal plane defined by the support surface 18. In other words, the terminal end 26 of the handle member 24' is configured for contact with a tabletop or the like such that the device 10 cannot tip as the compression lever is moved between open and closed configurations.

Figure 4:
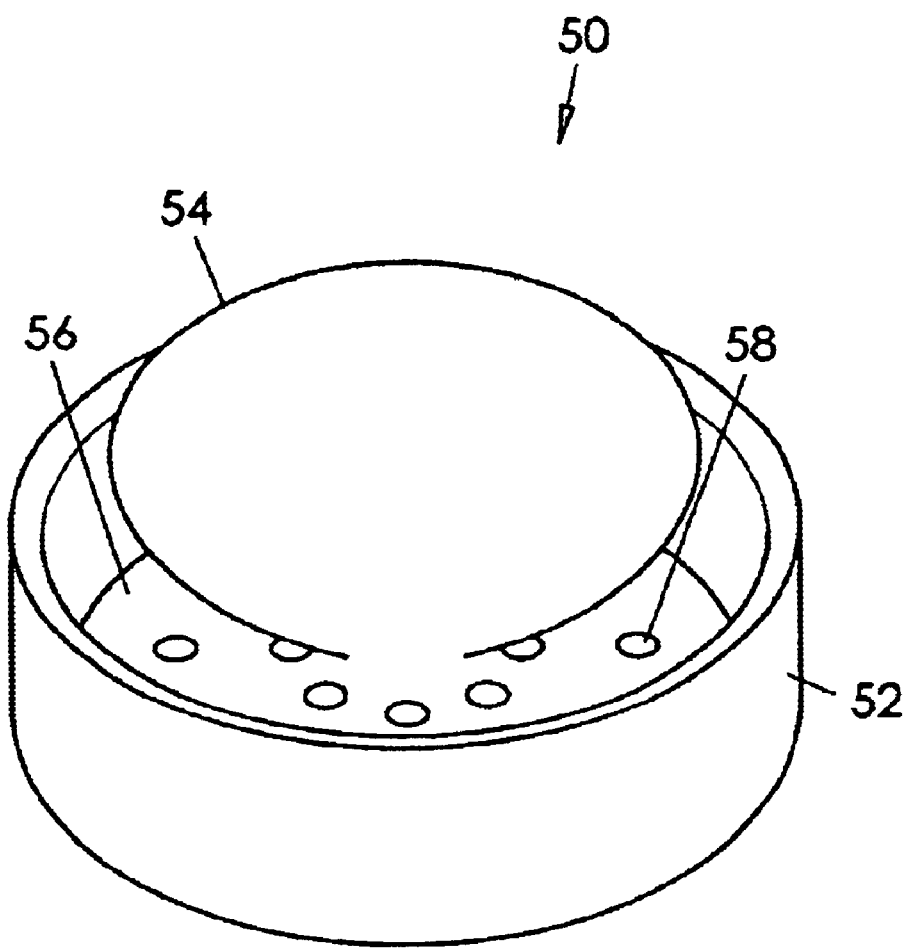
FIG. 4 is a perspective view of a device for draining liquid from canned goods according to another embodiment of the present invention in use with a canned food item.
Figure 5:
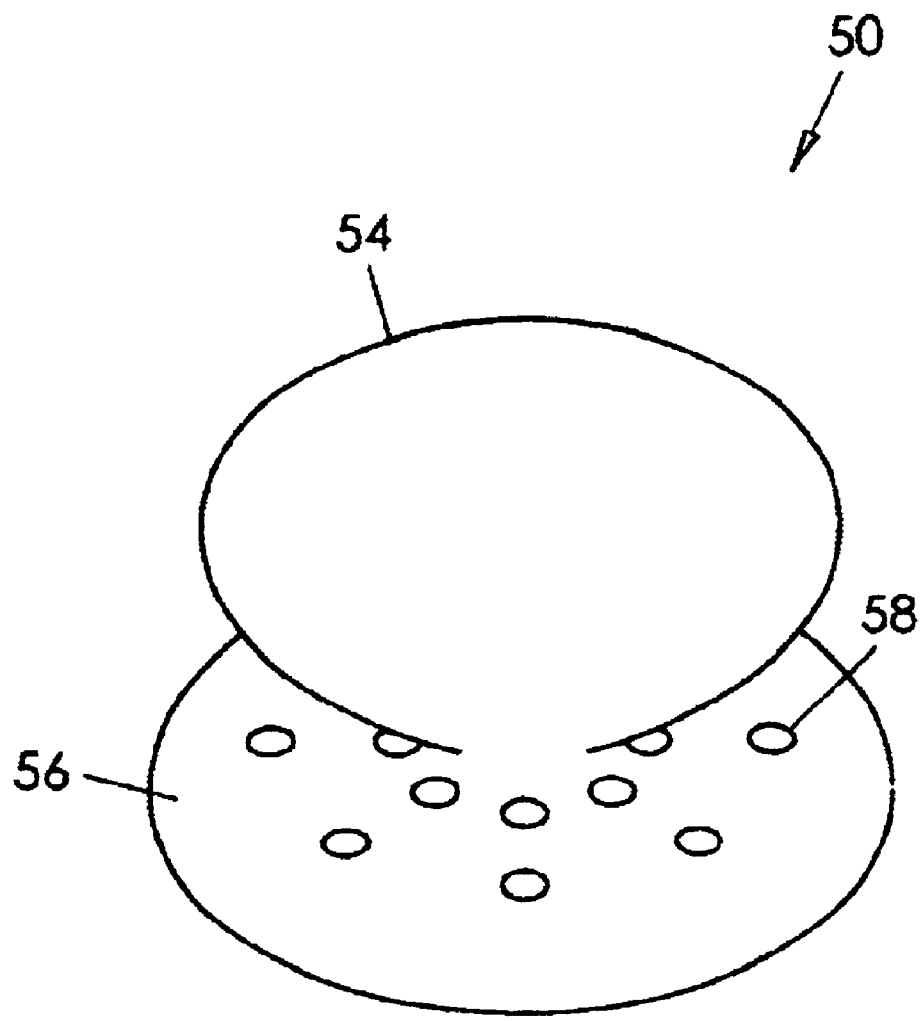
FIG. 5 is a perspective view of the device as in FIG. 4 with the can removed.

A device 50 for draining liquid from a canned good 52 according to another embodiment of the present invention is shown in FIGS. 4 and 5. The device 50 includes an ergonomic handle 54 with a piston 56 fixedly attached to a bottom surface of the handle 54. The handle 54 includes a knob-shaped configuration that may be comfortably grasped and held in the palm of a user's hand. The piston 56 defines a plurality of holes 58 for draining liquid from a food product packaged within the canned good in the manner previously described. In use, once a lid of a canned good 52 has been removed, a user may grasp the handle 54 of the device 50 and press the piston 56 against the canned food item. Liquid is thereby squeezed from the food item through the holes 58 in the piston 56 and may be poured therefrom.

Figure 6:
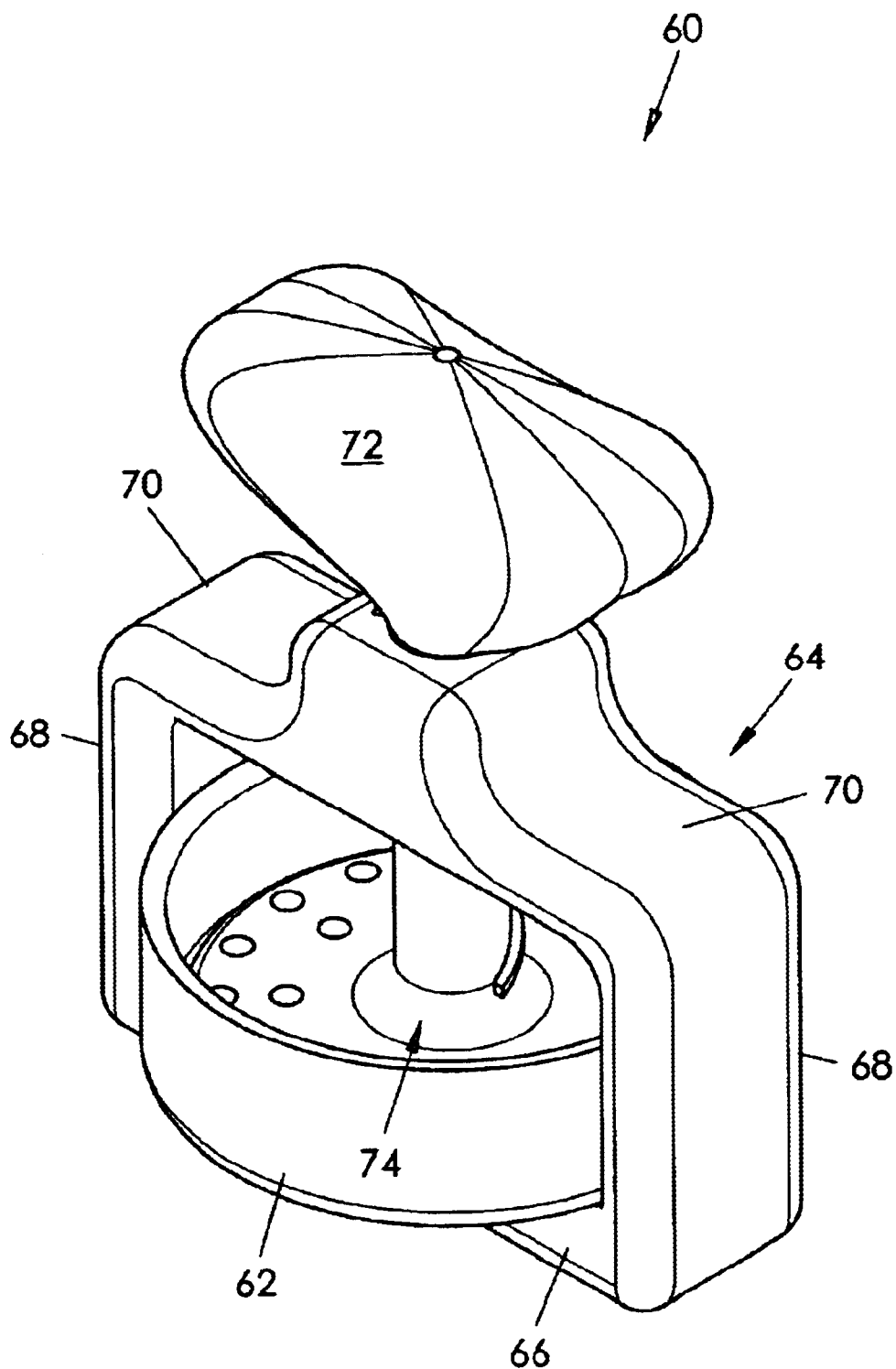
FIG. 6 is a perspective view of a device for draining liquid from canned goods according to still another embodiment of the present invention in use with a canned food item.
Figure 7A:
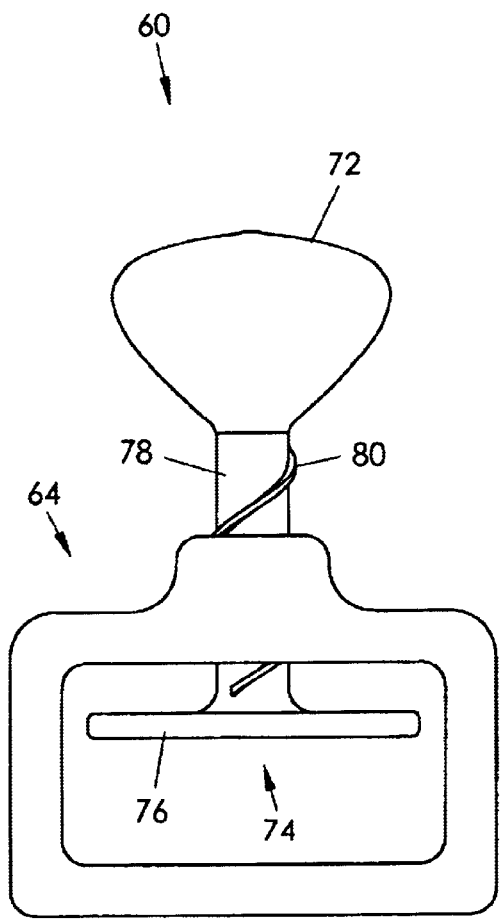
FIG. 7a is a front view of the device as in FIG. 6 with a piston in a load configuration.
Figure 7B:
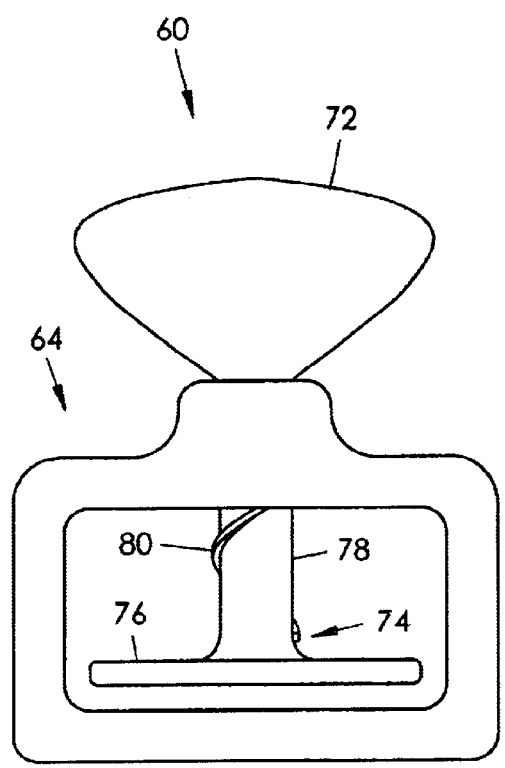
FIG. 7b is a front view of the device as in FIG. 6 with a piston in a press configuration.
Figure 8A:
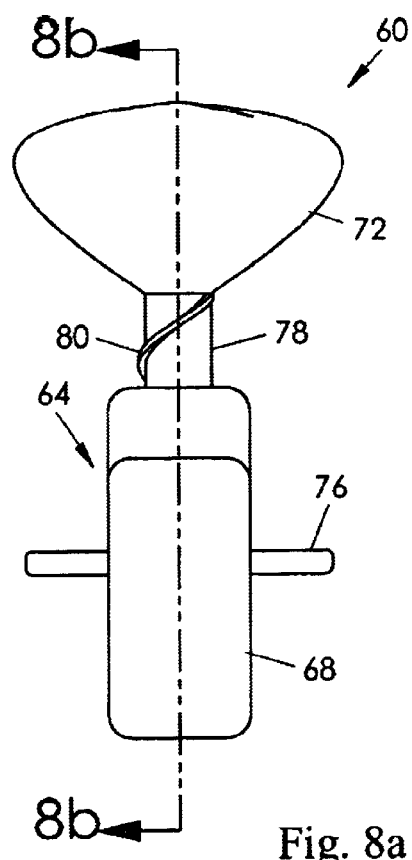
Figure 8B:
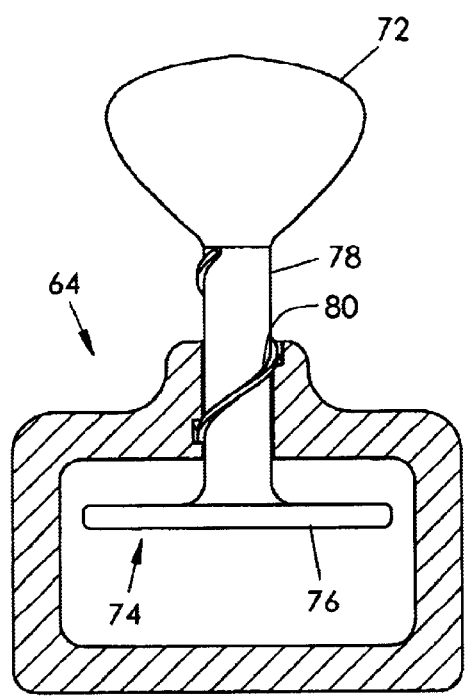
Figure 8C:
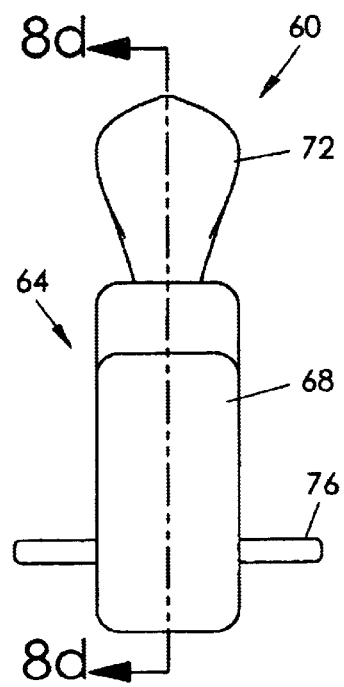
FIG. 8c is a side view of the device as in FIG. 7b.
Figure 8D:
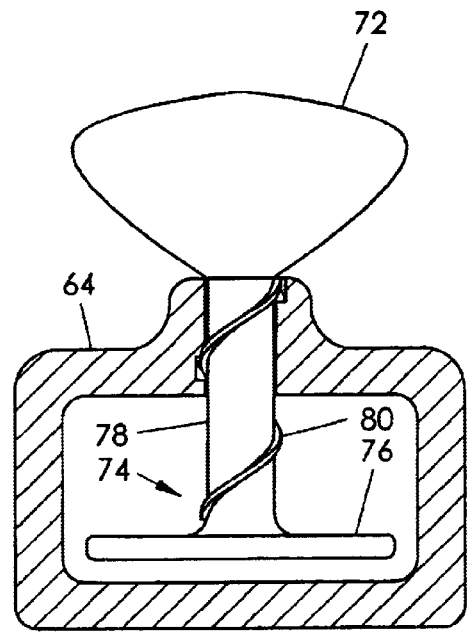
FIG. 8d is a sectional view taken along line 8d—8d of FIG. 8c.

Still another embodiment of a device 60 for draining liquid from a canned good 62 is shown in FIGS. 6 through 8. This embodiment includes a framework 64 having a bottom wall 66 with opposing side walls 68 extending upwardly from respective ends of the bottom wall 66 and having a top wall 70 extending between the side walls 68. The framework 64 defines an open front and an open back such that a canned good 62 may be positioned upon the bottom wall 66 and extend through the front and back (FIG. 6). The top wall 70 defines a bore therethrough, the bore including a plurality of threads extending interiorly thereabout. The device 60 according to this embodiment further includes a handle 72. Preferably, the handle 72 has a triangular configuration that may be easily grasped between the thumb and first finger of a person's hand, although other configurations would also be suitable for convenient grasping. The device 60 according to this embodiment also includes a piston 74 having a perforated disk 76 connected to the handle 72 with a shaft 78. The shaft 78 extends through the bore in the top wall 70 and includes threads 80 that are complementary to the threads within the bore such that the disk 76 may be moved between a load configuration (FIGS. 7*a* and 8*a*) and a press configuration (FIGS. 7*b* and 8*b*) upon a rotation of the handle 72. Therefore, liquid may be squeezed from a food item in a canned good 62 when the can lid is removed, the can is properly positioned on the bottom wall 66 of the framework 64, and the piston 74 is moved between load and press configurations upon a handle rotation.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A stable, tabletop device for draining liquid from canned goods, comprising:

a base lever having a completely linear configuration extending longitudinally between opposed first and second ends so as to form a flat support surface that is forwardly and rearwardly stable;

a handle member integrally connected to and situated atop said support surface adjacent said second end of said base lever, said handle member forming an oval configuration defining a hollow interior space for user grasping thereof;

said base lever having an upstanding end wall fixedly attached to said first end of said base lever and perpendicular to said support surface, said base lever defining a can receiving section between said end wall and said handle member wherein said can receiving section having a longitudinal extent for receiving cans of various diameter atop said base lever;

a compression lever having opposed first and second ends, said first end of said compression lever being pivotally coupled to a top edge of said end wall of said base lever such that said compression lever is pivotally movable between a closed configuration generally parallel to said support surface of said base lever and an open configuration angularly displaced from said support surface, said compression lever having a length that is substantially equal to a length of said base lever;

a magnet connected to an outer surface of said end wall, said magnet adapted to be coupled to a lid of said can, whereby to remove said lid from said can;

said compression lever including a plurality of longitudinally spaced apart sockets, said plurality of sockets being situated over said can receiving portion of said base lever when said compression lever is at said closed configuration; and a piston having a ball joint removably and rotatably coupled to a selected socket and having a perforated disk connected to said ball joint with a shaft, said disk adapted to contact a food item packaged within a can positioned on said can receiving portion, whereby to exert pressure thereon when said compression lever is moved between said open and closed configurations.

2. The device as in claim 1 wherein said first end of said compression lever is coupled to said top edge of said end wall at a pivot point, said pivot point being adjacent a top edge of said can when said can is positioned atop said can receiving section of said base lever, whereby to maximize a leverage ratio between said food item and said compression lever.

\* \* \* \* \*